(12) United States Patent
Liao et al.

(10) Patent No.: US 10,185,451 B2
(45) Date of Patent: Jan. 22, 2019

(54) CAPACITANCE SENSOR DEVICE AND DETECTING METHOD FOR A CONDUCTIVE MATTER THEREON

(71) Applicants: SALT INTERNATIONAL CORP., New Taipei (TW); IMAGINATION BROADWAY LTD., New Taipei (TW)

(72) Inventors: Zong-Bin Liao, New Taipei (TW); Meng-Chien Liu, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 47 days.

(21) Appl. No.: 15/378,996

(22) Filed: Dec. 14, 2016

(65) Prior Publication Data

US 2017/0177117 A1    Jun. 22, 2017

(30) Foreign Application Priority Data

Dec. 16, 2015  (TW) .............................. 104142378 A (51) Int. Cl.
*G06F 3/044*  (2006.01)
*G06F 3/041*  (2006.01)

(52) U.S. Cl.
CPC ............ *G06F 3/044* (2013.01); *G06F 3/0416* (2013.01)

(58) Field of Classification Search
CPC ....................................................... G06F 3/044
See application file for complete search history.

(56) References Cited

U.S. PATENT DOCUMENTS

| 8,982,097 | B1 * | 3/2015 | Kuzo | .................... G06F 3/0418 345/174 |
| 2013/0207935 | A1 * | 8/2013 | Toda | ....................... G06F 3/0418 345/174 |
| 2015/0331541 | A1 * | 11/2015 | Chang | .................... G06F 3/0418 345/174 |

FOREIGN PATENT DOCUMENTS

CN            104142768         11/2014

* cited by examiner

*Primary Examiner* — Hang Lin
(74) *Attorney, Agent, or Firm* — Andrew M. Calderon; Roberts Mlotkowski Safran Cole & Calderon, P.C.

(57) ABSTRACT

A detecting method for a conductive matter on a capacitive sensor device includes obtaining a positive signal, computing a signal summation of a plurality of sensing points in at least an electrode line where the positive signal is occurred, comparing the signal summation to a predetermined value, determining a touch object inducing the positive signal is not an irregular conductive matter if the signal summation is larger than the predetermined value, and determining the touch object inducing the positive signal is the irregular conductive matter if the signal summation is not larger than the predetermined value.

16 Claims, 10 Drawing Sheets

CAPACITANCE SENSOR DEVICE AND DETECTING METHOD FOR A CONDUCTIVE MATTER THEREON

CROSS-REFERENCE TO RELATED APPLICATION

This non-provisional application claims priority under 35 U.S.C. § 119(a) to Patent Application No. 104142378 filed in Taiwan, R.O.C. on Dec. 16, 2015, the entire contents of which are hereby incorporated by reference.

BACKGROUND

Technical Field

The instant disclosure relates to a capacitive sensing technique, in particular to a capacitance sensor device and detecting method for a conductive matter thereon.

Related Art

To enhance convenience in operation, more and more electronic devices are equipped with touch screens as the operating interface, such that a user can operate the device by directly touching the screen, thereby providing more convenient and friendly operating mode. The touch screen is primarily made of a displaying device having displaying capabilities and a sensing device providing touch-sensing capabilities.

Based on structural characteristics and sensing modes, sensing devices can be divided into the following categories: impedance sensing devices; capacitive sensing devices; acoustic sensing devices; optical (infrared), sensing devices; and electromagnetic sensing devices. In particular, sensing devices of capacity type do not need elastic material that reacts to external forces, are less responsive to ambient lighting condition, and have a simpler manufacturing process. Thus most current touch screens use capacitive sensing devices.

When the capacitive sensing device has an irregular conductive matter region (such as water or other conductive matter), the equivalent circuit and equivalent parasitic capacitance between the axial conductive lines in the region change accordingly. Consequently, the control sensing circuit picks up a change in the electrical current or charge transferred on the axial conductive lines, leading to false positives and false motion. In another scenario, if the touched point is in the irregular conductive matter region, the control sensing circuit detects a relatively smaller amount of electrical current or charge transfer for the axial conductive lines at the touched location. Additionally, due to the irregular conductive matter region, the conductive lines are connected to adjacent axial conductive lines (connected to ground via the adjacent axial conductive lines), thus rendering the control sensing circuit unable to identify the touched location correctly.

Therefore, how to effectively avoid false positives and wrong actions due to the irregular conductive matter(s) is one of the research goals undertaken by the industry.

SUMMARY

In one embodiment, a detecting method for a conductive matter on a capacitive sensing device comprises: obtaining a positive signal; computing a signal summation of a plurality of sensing points on at least one electrode line selected from a plurality of transmitting electrode lines and receiving electrode lines where the positive signal is occurred; comparing the signal summation to a predetermined value; determining a touch object inducing the positive signal is not an irregular conductive matter if the signal summation is greater than the predetermined value; and determining the touch object inducing the positive signal is the irregular conductive matter if the signal summation is not greater than the predetermined value.

In one embodiment, a capacitive sensing device comprises: a plurality of first electrode lines, a plurality of second electrode lines crossing the first electrode lines, and a sensing controller. The first electrode lines and the second electrode lines define a plurality of sensing points in matrix. The sensing controller is electrically connected to the first second electrode lines and the second electrode lines. The sensing controller executes: obtaining a positive signal; computing a signal summation of the sensing points on at least one electrode line selected from the first and second electrode lines where the positive signal is occurred; comparing the signal summation to a predetermined value; determining a touch object inducing the positive signal is not an irregular conductive matter if the signal summation is greater than the predetermined value; and determining the touch object inducing the positive signal is the irregular conductive matter if the signal summation is not greater than the predetermined value.

Based on the above, according to the embodiments of the capacitive sensing device and detecting method for the conductive matter thereon, the touch object may be determined whether it is an irregular conductive matter or not, thereby ruling out false motion due to the irregular conductive matter. Additionally, according to some embodiments of the capacitive sensing device and detecting method for the conductive matter thereon, the detecting steps are upgraded to increase detecting speed and computing efficiency.

DETAILED DESCRIPTION

First, any embodiment of a detection method for a conductive matter on a capacitive sensing device according to the instant disclosure is applicable to a touch sensing apparatus. The touch sensing apparatus may be but not limited to a touch screen, a digital drawing tablet, a handwriting tablet, or an electronic device equipped with a touch sensing device. The electronic device with the touch sensing device may be but not limited to a smart phone, a personal navigation device (PND), a digital photo frame (DPF), an E-book, notebook, a tablet or a pad. As to the "touch event" described hereinbelow, for example, when the touch sensing apparatus is the touch screen, the touch event for the touch screen may be induced by the touch object such as a finger or a touch pen. When the touch sensing apparatus is the digital drawing tablet, the touch event for the digital drawing tablet may be induced by the touch object such as a touch pen. When the touch sensing apparatus is the handwriting tablet, the touch event for the handwriting tablet may be induced by the touch object such as stylus or finger.

Figure 1:
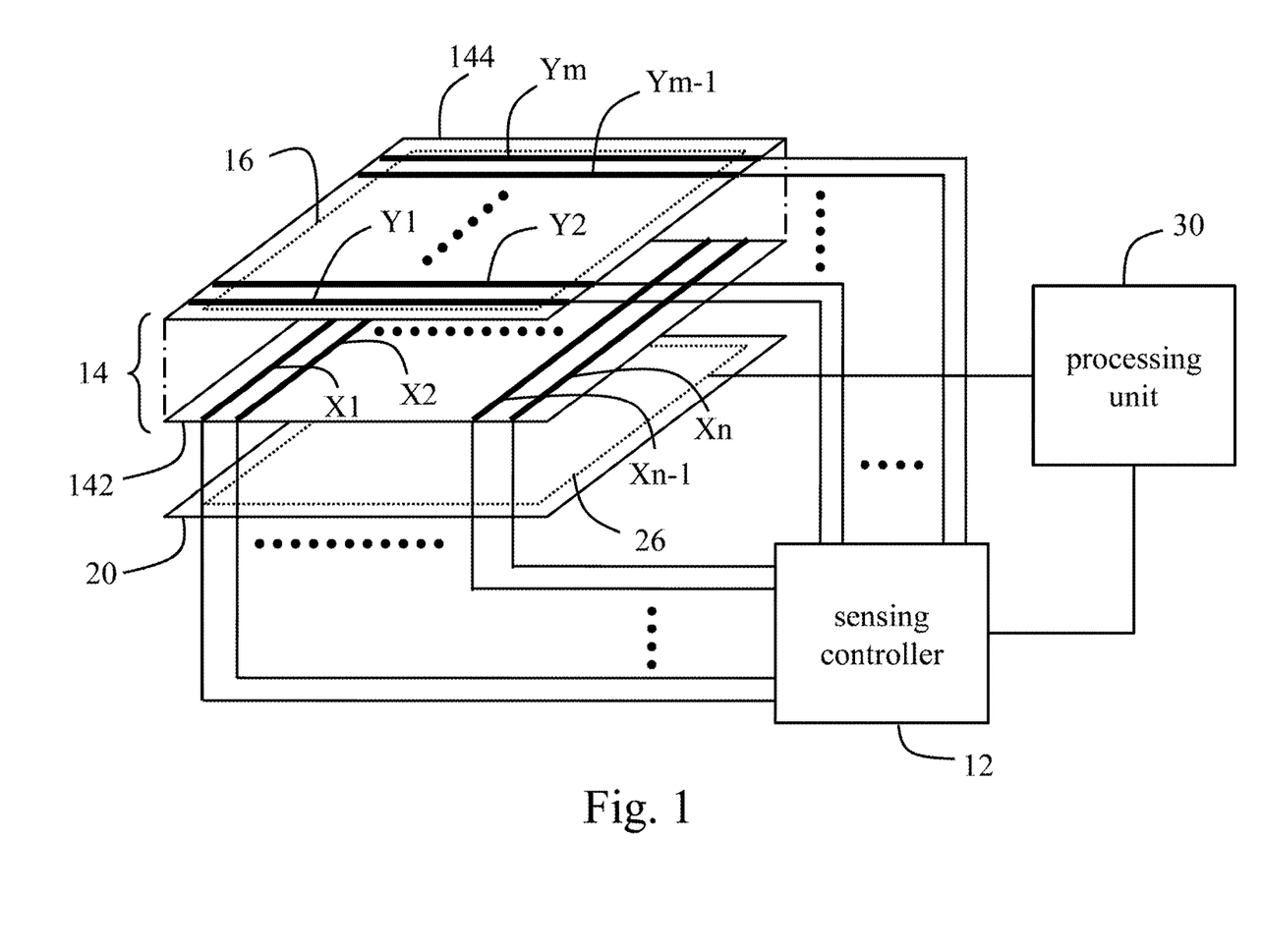
FIG. 1 is a schematic view of a touch sensing apparatus with any embodiment of a capacitive sensing device according to the instant disclosure.
Figure 2:
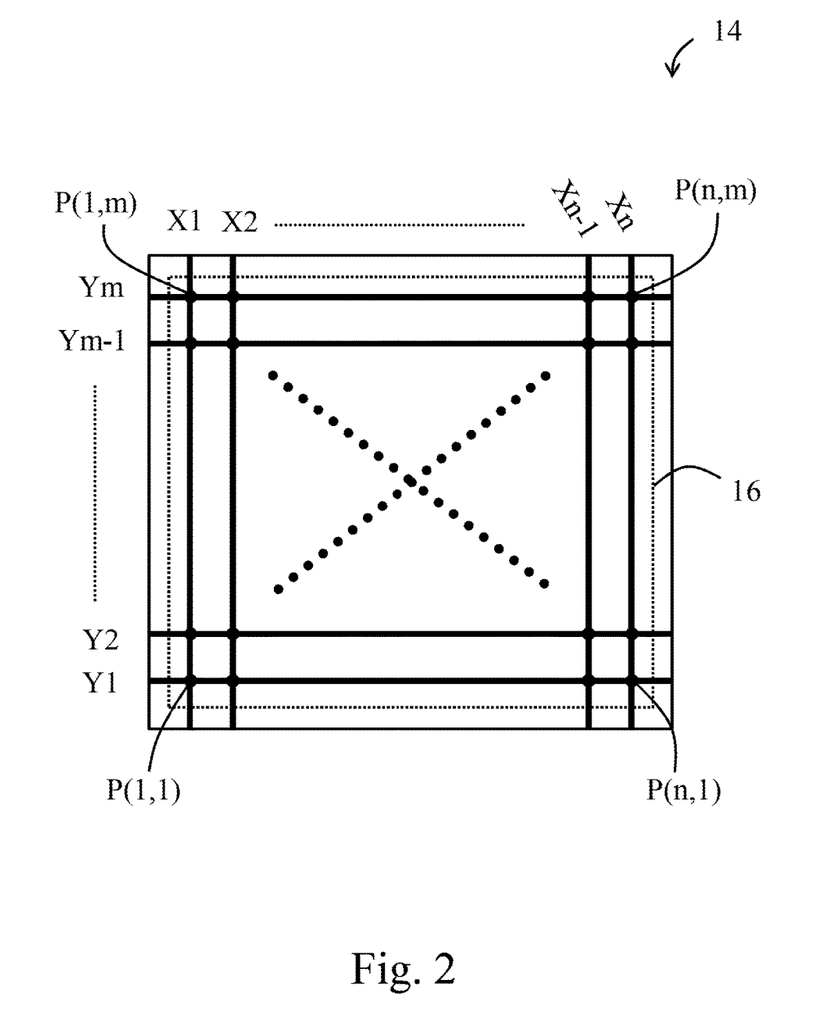
FIG. 2 is a schematic view for one embodiment of a signal sensor in FIG. 1.

FIG. 1 is a schematic view of a touch sensing apparatus with any embodiment of a capacitive sensing device according to the instant disclosure. FIG. 2 is a schematic view for one embodiment of a signal sensor in FIG. 1. For the description provided hereinbelow, electronic device is used as an example of the touch sensing apparatus for explanatory purposes but is not limited thereto.

Please refer to FIG. 1. The touch sensing apparatus comprises a capacitive sensing device, a display 20, and a processing unit 30. The capacitive sensing device includes a sensing controller 12 and a signal sensor 14. The sensing controller 12 is connected to the signal sensor 14, and the signal sensor 14 is disposed on the displaying surface of the display 20. The processing unit 30 is electrically connected to the sensing controller 12 and the display 20. The signal sensor 14 includes a plurality of electrode lines (e.g., first electrode lines X1, X2 to Xn-1, Xn, and second electrode lines Y1, Y2 to Ym-1, Ym), which are alternately arranged. Herein, n and m are positive integers. Further, n may be equal to or not equal to m. The first electrode lines X1, X2 to Xn-1, Xn and the second electrode lines Y1, Y2 to Ym-1, Ym are electrically connected to the sensing controller 12.

Based on a top view (facing to the displaying surface), the first electrode lines X1, X2 to Xn-1, and Xn and the second electrode lines Y1, Y2 to Ym-1, and Ym cross one another and define a plurality of sensing points P (1,1) to P (n,m) in a matrix, as shown in FIG. 2. In other words, the first electrode lines X1, X2 to Xn-1, Xn and the second electrode lines Y1, Y2 to Ym-1, Ym jointly define a planar coordinate system. Based on the instant embodiment, the first electrode lines X1, X2 to Xn-1, Xn and the second electrode lines Y1, Y2 to Ym-1, Ym define a right angle coordinate system (i.e., Cartesian coordinate system), but is not limited thereto. For example, other possibilities include polar coordinate system, non-right angle coordinate system, or other planar coordinate systems. In some embodiments, the overlapping of the first electrode lines X1, X2 to Xn-1, Xn and the second electrode lines Y1, Y2 to Ym-1, Ym present a diamond shaped honey comb-like pattern, grid-like pattern, or palisade-like pattern.

In some embodiments, the first electrode lines X1, X2 to Xn-1, Xn and the second electrode lines Y1, Y2 to Ym-1, Ym may be arranged in different planes. In other words, the signal sensor 14 includes two sensing layers (referred to as a first sensing layer 142 and a second sensing layer 144). The first sensing layer 142 includes the first electrode lines X1, X2 to Xn-1, Xn arranged in parallel, while the second sensing layer 144 includes the second electrode lines Y1, Y2 to Ym-1, Ym arranged in parallel. The second sensing layer 144 is arranged above and overlaps the first sensing layer 142, while the first sensing layer 142 is disposed on the displaying surface of the display 20. A dielectric layer (not shown) may be sandwiched between the first and second sensing layers 142 and 144, but is not limited thereto.

In some other embodiments, the first electrode lines X1, X2 to Xn-1, Xn and the second electrode lines Y1, Y2 to Ym-1, Ym may be arranged on a same plane. That is to say both types of electrode lines are arranged on a single sensing layer.

In some embodiments, the first electrode lines X1, X2 to Xn-1, Xn are transmitting electrode lines, while the second electrode lines Y1, Y2, to Ym-1, Ym are receiving electrode lines. Additionally, in some embodiments the first electrode lines X1, X2 to Xn-1, Xn are receiving electrode lines, while the second electrode lines Y1, Y2, to Ym-1, Ym are transmitting electrode lines.

In some embodiments, the electrode lines of the sensing layer may be patterned.

In some embodiments, the sensing layer may be transparent or semi-transparent. Thus, when the display 20 is displaying information, the user may see the information shown by the display 20 through the sensing layer. In other words, light emitted by the display 20 can penetrate all of the sensing layers and reach the eyes of the user. In some embodiments, the sensing layer may be a patterned conductive thin film such as an indium-tin oxide (ITO) film (but not limited thereto).

In some embodiments, the sensing layer may be neither transparent nor semi-transparent. For example, the touch sensing apparatus with the non-transparent sensing layer may be the digital drawing tablet or handwriting table or other the touch sensing apparatus without the display 20.

In some embodiments, the processing unit 30 may be an internal processor or a processor of an external device.

When the user touches the capacitive sensing device, the capacitive sensing device detects the touch event (touching action), which is further processed by the processing unit 30. The aforementioned further processing is depended on application software of the display 20 corresponding to the touch location of the touch event. For instance, further processing may refer to initiating a software application by the processing unit 30 in response to the touch event or showing the pen touch mark at the touch location of the touch event, but is not limited thereto.

The region of the display 20 for showing information (i.e. the displaying surface) is typically referred to as an active area 26. The region of the signal sensor 14 corresponding to the active area 26 may be referred to as a sensing area 16. The sensing area 16 is used for detecting whether a user has induced a touch event. Sensing points P(1, 1) to P(n, m) are defined within the sensing region 16.

The sensing controller 12 may adopt self-capacitance type of touch sensing technique or mutual capacitance type of touch sensing technique to detect the touch motion by a user. Besides the detection of the touching action, the sensing controller 12 also performs a detection of an irregular conductive matter (e.g., water), to eliminate false motion due to the irregular conductive matter.

Figure 3:
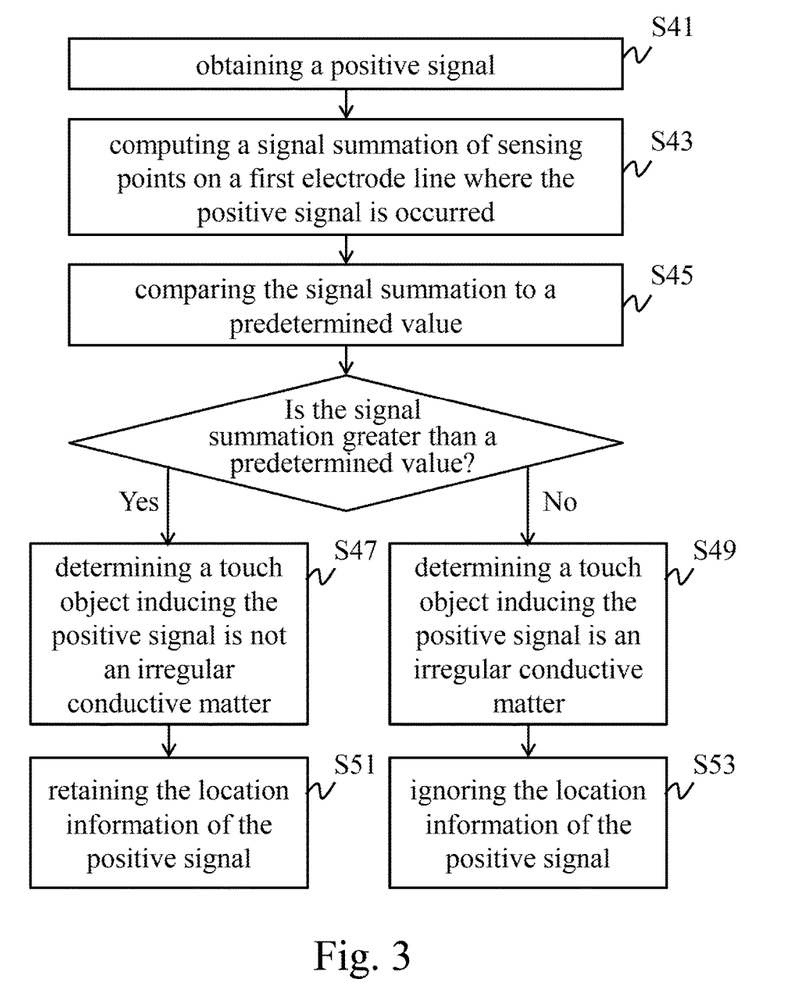
FIG. 3 is a flowchart for a first embodiment of a detecting method for a conductive matter on the capacitive sensing device according to the instant disclosure.
Figure 4:
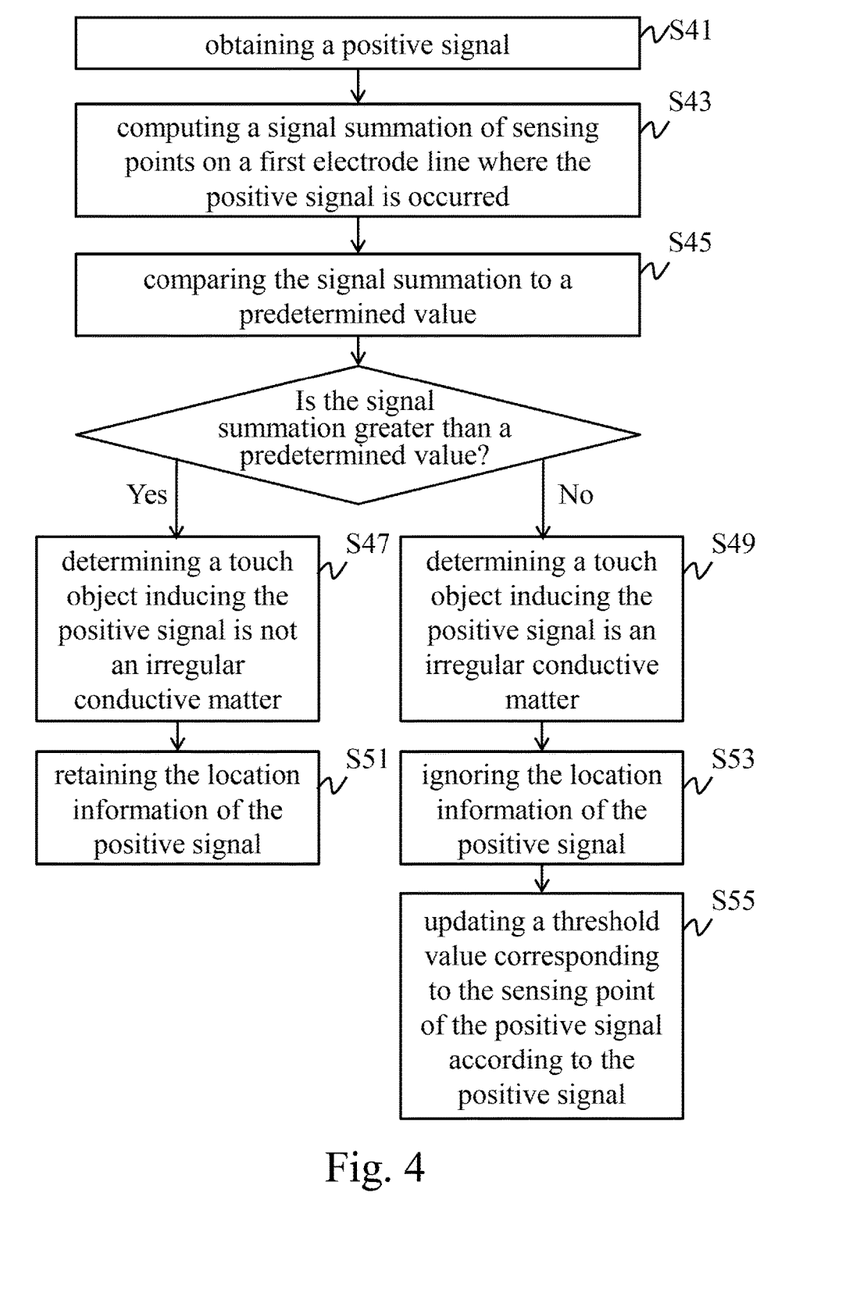
FIG. 4 is a flowchart for a second embodiment of the detecting method for the conductive matter on the capacitive sensing device according to the instant disclosure.
Figure 5:
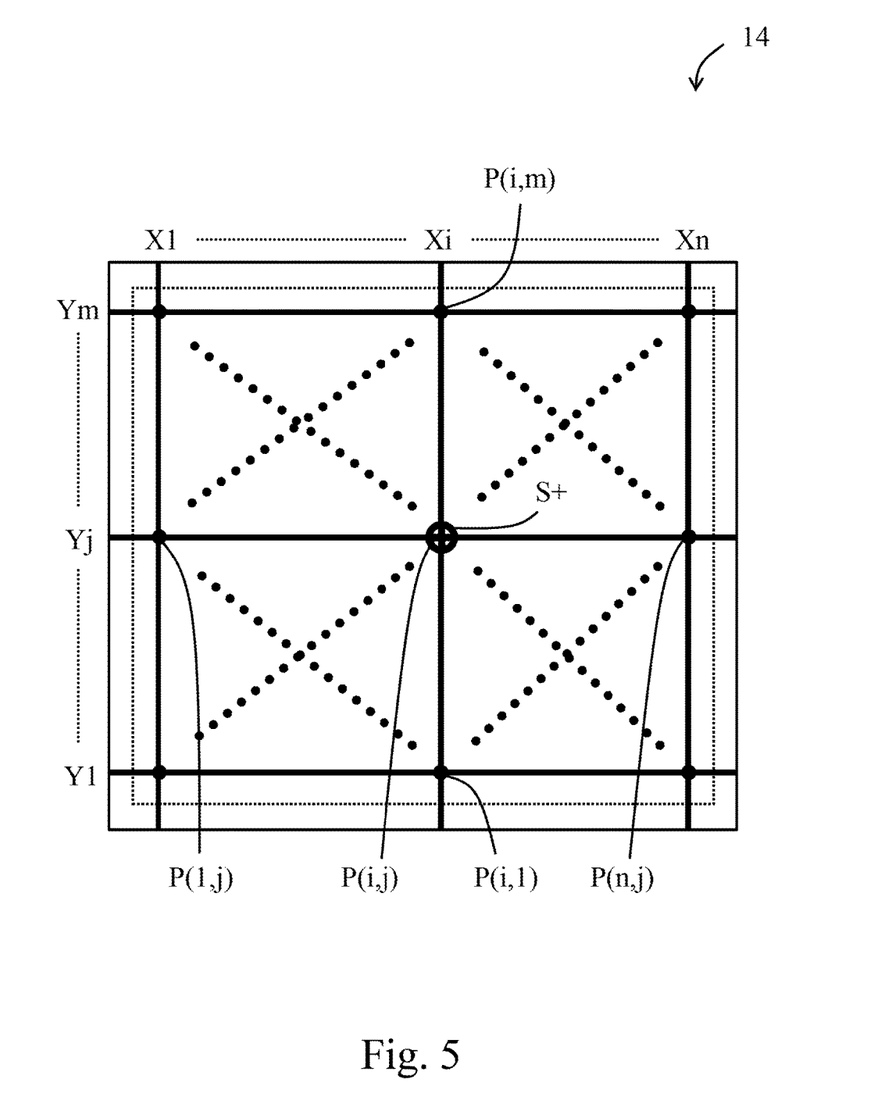
FIG. 5 is a schematic view for one embodiment of a touch event for any embodiment of the capacitive sensing device according to the instant disclosure.

FIG. 3 is a flowchart for a first embodiment of a detecting method for a conductive matter on the capacitive sensing device according to the instant disclosure. FIG. 4 is a flowchart for a second embodiment of the detecting method for the conductive matter on the capacitive sensing device according to the instant disclosure. FIG. 5 is a schematic view for one embodiment of a touch event for any embodiment of the capacitive sensing device according to the instant disclosure.

The sensing controller 12 scans the conductive wires. When a touch object is disposed on the signal sensor 14, the sensing point P (i, j) associated with the location of the touch object generates a positive signal S+, as shown in FIG. 5. Please note that i and j are positive integers. Herein, i and j may be equal to or not equal to each other. In some embodiments, the sensing controller 12 scans the signal of every sensing point P and compares the scanned signals with the corresponding threshold values. When the sensing controller 12 detects that the signal of the sensing point P (i, j) is greater than the corresponding threshold value (i.e., it is determined that the signal of the sensing point P (i, j) reachs the strength of a finger signal), the sensing controller 12 determines that a touch event exists at this sensing point P (i, j) and generates location information associated with this particular sensing point P (i, j). In other words, the location information represents the location of one of the sensing points for a touch event. In addition, the sensing controller 12 gathers location information of the adjacent sensing points (to be referred to as a touch point hereinafter) associated with the touch event and determines to be the touch location of the touch point. For clear explanation, the sensing point signal greater than its threshold value is referred to as the positive signal S+. That is to say one touch location represents one finger touching, and one finger touching leads to the occurrence of multiple positive signals.

Please refer to FIGS. 3 and 4. The sensing controller 12 obtains the positive signal S+ of the sensing point P (i, j) (Step S41) and stores the location information of the touch point associated with the sensing point P (i, j) in the memory unit (not shown but can be built in the sensing controller 12 or disposed externally thereof). When the sensing controller 12 receives the positive signal of the sensing point P (i, j), the sensing controller 12 computes a signal summation of all the sensing points P (i, 1) to P (i, m) on the first electrode line Xi (Step S43). Although the flowchart illustrates the computation of the signal summation of all the sensing points P (i, 1) to P (i, m) on the first electrode line X1 where the positive signal is occurred, but not limited thereto, the Step S43 may be replayed with computing the signal summation (not shown) of the positive signals S+ of all the sensing points P (i, 1) to P (i, m) on the first electrode line Xi where the positive signal S+ is occurred and P (1, j) to P (n, j) on the second electrode line Yj where the positive signal S+ is occurred, or with computing the signal summation (not shown) of all the sensing points P (1, j) to P (n, j) on the second electrode line Yj where the positive signal S+ is occurred.

The sensing controller 12 compares the computed signal summation with a predetermined value (step S45). In some embodiments, the predetermined value may be zero to two times the finger signal (i.e., two times the threshold value).

When the computed signal summation is greater than the predetermined value, the sensing controller 12 determines the touch object that induces the positive signal S+ is not the irregular conductive matter (step S47). Additionally, after that, the touch object that induces the positive signal S+ is not the irregular conductive matter, is determined, the sensing controller 12 retains the location information of the positive signal S+ (step S51). That is to say the gather of the location information and the determination of the touch location is performed based on the location information of the sensing point P (i, j) of the positive signal S+.

In some embodiments, as shown in FIG. 3, if it is determined that the touch object that induces the positive signal S+ is the irregular conductive matter, the sensing controller 12 ignores the location information of the touch point associated with the sensing point P (i, j) of the positive signal S+ (step S53). In other words, if it is determined that the touch object that induces the positive signal S+ is the irregular conductive matter, the sensing controller 12 abandons the location information of the sensing point P (i, j) of the positive signal S+ stored in the memory unit.

In some embodiments, as shown in FIG. 4, if it is determined that the touch object that induces the positive signal S+ is the irregular conductive matter, the sensing controller 12 ignores the corresponding location information and also updates the corresponding predetermined value of the sensing point P (i, j) of the positive signal S+ based on the positive signal S+ (step S55), in order to exclude the signal of this sensing point P (i, j) in the beginning. That is to say the sensing point P (i, j) will not be detected as having a touch event. In some embodiments, the sensing controller 12 does not necessarily perform step S55 every time if it is determined that the touch object is the irregular conductive matter. In other words, the sensing controllers 12 records the number of times that it is consecutively determined that the touch object is the irregular conductive matter, based on the positive signal S+ for the same sensing point P (i, j). After the number of consecutive times has reached a predetermined number, step S55 is then implemented.

Figure 6:
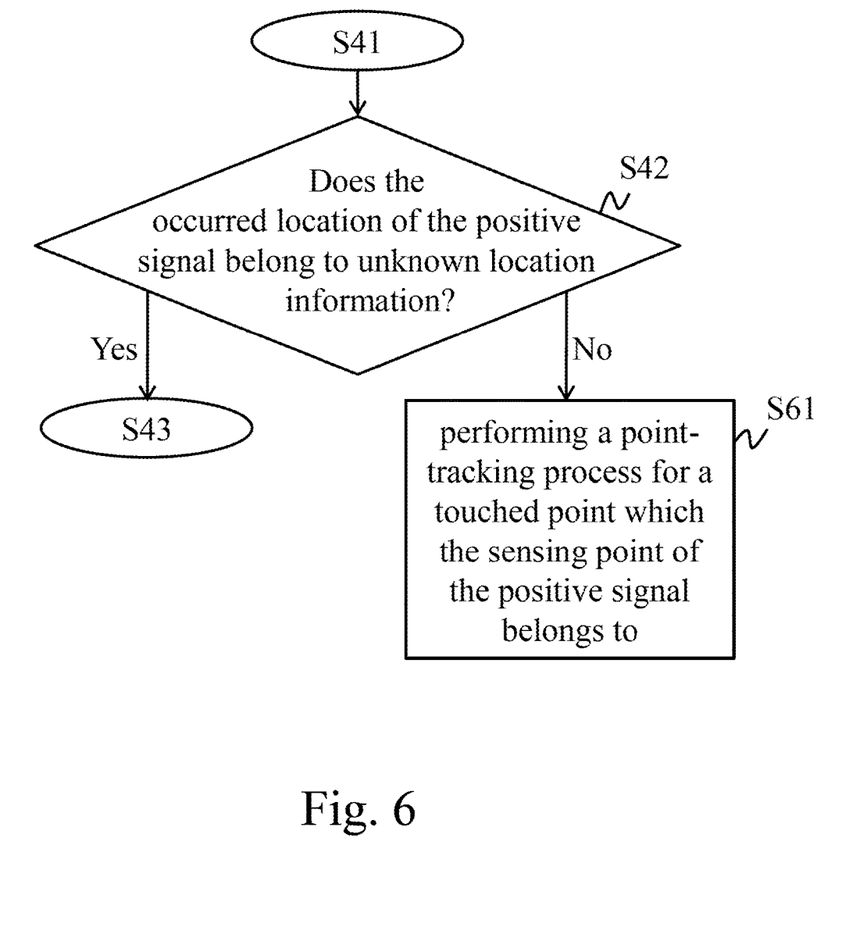
FIG. 6 is a partial flowchart for a third and fourth embodiments of the method detecting for the conductive matter on the capacitive sensing device according to the instant disclosure.

FIG. 6 is a partial flowchart for a third and fourth embodiments of the method detecting for the conductive matter on the capacitive sensing device according to the instant disclosure.

In some embodiments as shown in FIG. 6, prior to step S43 of computing the signal summation, the sensing controller 12 first verifies whether the occurred location of the positive signal S+ belongs to unknown location information (step S42). For example: verifying whether the memory unit has the location information of the sensing point P (i, j). Once it is verified that the occurred location of the positive signal S+ belongs to unknown location information (e.g., the memory unit does not include the location information of the sensing point P (i, j)), the sensing controller 12 then starts to implement the step of computing the signal summation (i.e., continuing to step S43 and subsequent steps), as shown in FIGS. 3 and 4. If it is verified that the occurred location of the positive signal S+ belongs to known location information (e.g., the memory unit has the location information of the sensing point P (i, j)), the sensing controller 12 does not implement the step of computing the signal summation (i.e., does not continue to Step S43 and subsequent steps), but instead performs a point-tracking process based on the positive signal S+ (step S61). In other words, the sensing controller 12 tracks the displacement path of the touch point associated with the sensing point P (i, j) of the positive signal S+ (step S61).

Figure 7:
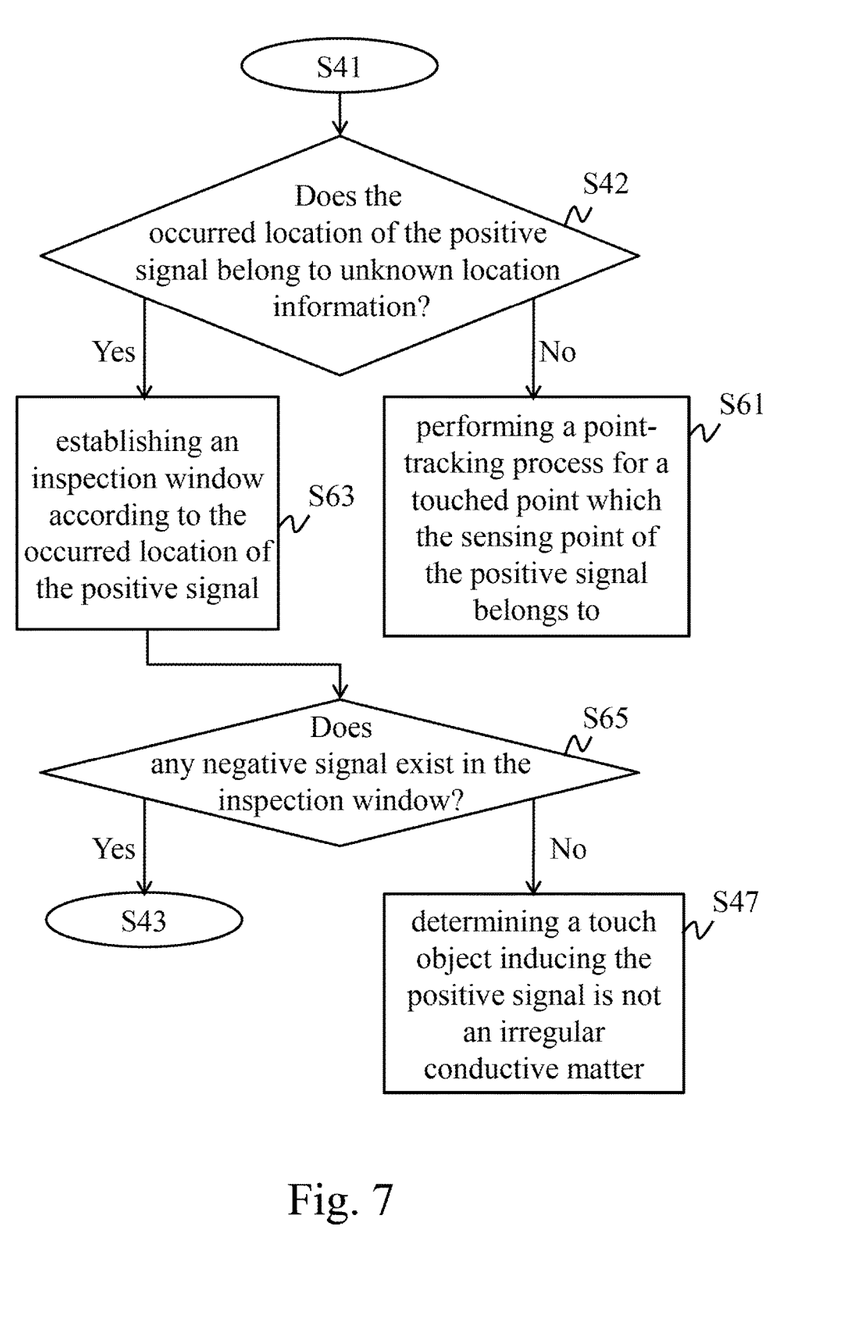
FIG. 7 is a partial flowchart for a fifth and sixth embodiments of the detecting method for the conductive matter on the capacitive sensing device according to the instant disclosure.

FIG. 7 is a partial flowchart for a fifth and sixth embodiments of the detecting method for the conductive matter on the capacitive sensing device according to the instant disclosure.

In some embodiments as shown in FIG. 7, prior to the step of computing the signal summation (step S43), the sensing controller 12 first verifies whether the occurred location of the positive signal S+ belongs to unknown location information (step S42).

If it is verified that the occurred location of the positive signal S+ belongs to the known location information, the sensing controller 12 does not implement the step of computing the signal summation (i.e., does not continue to Step S43 and subsequent steps), but instead performs the point-tracking process based on the positive signal S+ (step S61).

Figure 8:
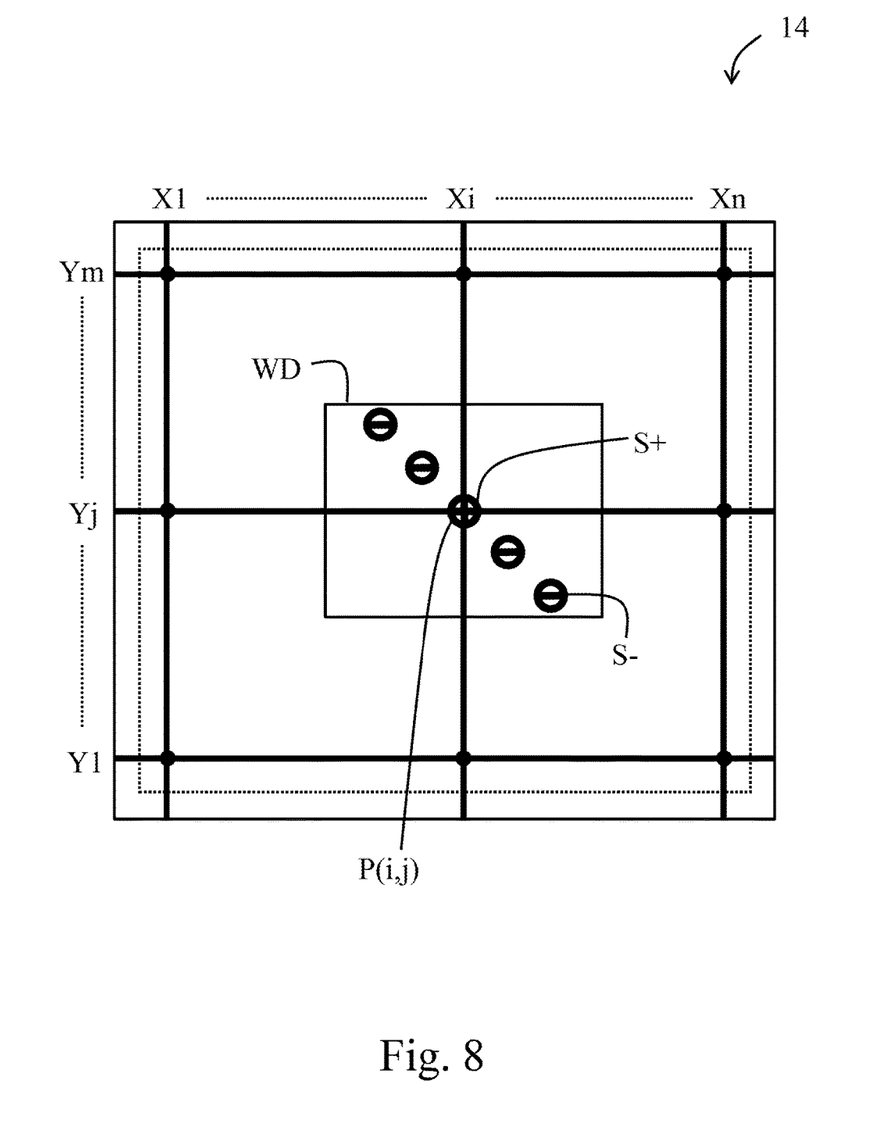
FIG. 8 is a schematic view for another embodiment of the touch event for any embodiment of the capacitive sensing device according to the instant disclosure.

If it is verified that the occurred location of the positive signal S+ belongs to the unknown location information (e.g., the memory unit does not include the location information of the sensing point P (i, j)), the sensing controller 12 defines a digital inspection window WD (step S63), as shown in FIG. 8. The size of the inspection window WD may be a*b. That is to say there are a*b number of sensing points, which include the sensing point P (i, j). It should be noted that variables a and b may be positive integers, and a may be equal to or not equal to b. In some embodiments, the sensing point P (i, j) is situated at the center of the inspection window. In other words, the sensing controller 12 uses the sensing point P (i, j) as the center point for laying out the inspection window WD of size a*b.

Next, the sensing controller 12 detects whether a negative signal S− exists in the inspection window WD (step S65). If yes, the sensing controller 12 then implements the step of computing signal summation (i.e., continuing to step S43 and subsequent steps), as shown in FIGS. 3 and 4. If no, the sensing controller 12 determines the touch object that induces the positive signal S+ is not the irregular conductive matter (step S47).

Figure 9:
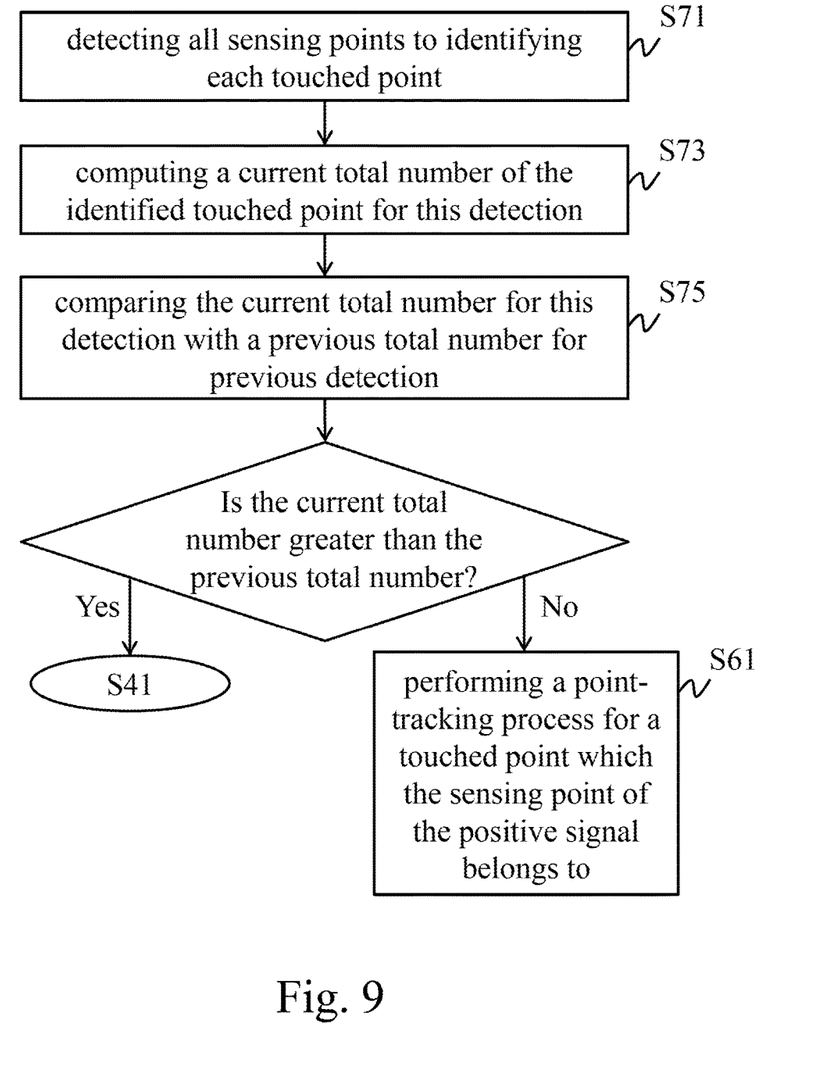
FIG. 9 is a partial flowchart for a seventh and eight embodiments of the detecting method for the conductive matter on the capacitive sensing device according to the instant disclosure.

In some embodiments as shown in FIG. 9, prior to the step of inspecting the signal summation (step S41), the sensing controller 12 first detects all of the sensing points P (1, 1) to P (n, m) on the signal sensor 14 in order to identify all of the touched points (step S71), exist on the signal sensor 14. That is to gather binary large object (blob), prior to detect the positive signal S+ and determine the touch point according to the blob.

After all of the touched points have been identified, the sensing controller 12 computes the total number of the detected touched points (to be referred to as the current total number) (step S73), and compares the current total number with the total number of touched points detected from previous detection (to be referred to as the previous total number) (step S75).

If the current total number is not greater than the previous total number, the sensing controller 12 performs the point-tracking process (step S61), for each touched point. That is to say tracking the displacement path of each touched point.

Conversely, if the current total number is greater than the previous total number, the sensing controller 12 carries out the inspection process of signal summation with respect to each positive signal S+. That is to say implementing step S41 and its subsequent steps (FIGS. 3 and 4).

In some embodiments, if the current total number is greater than the previous total number, the sensing controller 12 may perform the inspection process of signal summation by using the inspection window WD. Please refer to FIG. 10. After the positive signal S+ of the sensing point P (i, j) has been obtained (step S41), the sensing controller 12 first establishes the inspection window WD according to the occurred location (i.e., sensing point P (i, j)) of the positive signal S+ (step S63), and detects whether the negative signal S− exists in the inspection window WD or not (step S65). If the sensing controller 12 determines that there is at least one negative signal S− in the inspection window WD, the sensing controller 12 proceeds to perform the step of computing signal summation (i.e., continuing to step S43 and subsequent steps). If the sensing controller 12 determines that there is not any negative signal S− in the inspection window WD, the sensing controller 12 determines the touch object that induces the positive signal S+ is not the irregular conductive matter (step S47).

Figure 10:
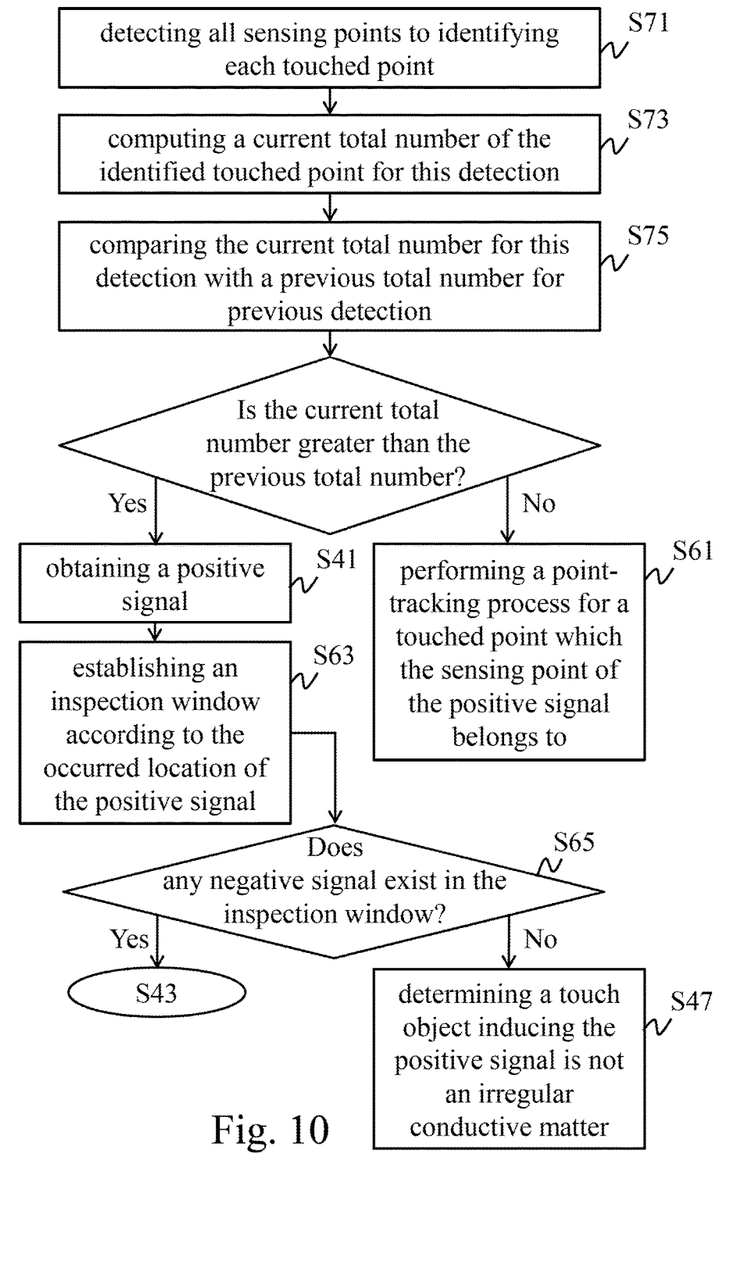
FIG. 10 is a partial flowchart for a ninth and tenth embodiments of the detecting method for the conductive matter on the capacitive sensing device according to the instant disclosure.

After the sensing controller 12 has completed the inspection process of signal summation with respect to each of all the positive signals S+, the sensing controller 12 then determines the remaining touched points based on the remaining location information (remaining blob), and saves the total number of the remaining touched points in the memory unit as the previous total number for next detection.

It should be understood that the sequence of performing aforementioned steps is not limited to the above described explanation. The implementation sequence may be adjusted according to the content of each step.

In some embodiments, the aforementioned memory unit can be made of one or more memory element. Each memory element can be a read-only memory, dynamic random access memory (DRAM), volatile memory, static memory, dynamic memory, flash memory and/or any other device for storing digital information.

In some embodiments, the detecting method for the conductive matter on the capacitive sensing device of the instant disclosure can be realized by a computer programmed device. Therefore, after a computer (i.e., any touch sensing device), has downloaded the software program, it can carry out any embodiment of the detecting method for the conductive matter on the capacitive sensing device of the instant disclosure. In some embodiments, the computer programmed product may be a random access medium, while the abovementioned software program is stored in the random access medium for downloading by the computer. In some embodiments, the abovementioned software program is a computer program product, which is transmitted to the computer by wired or wireless technique.

Based on the above, according to the embodiments of the capacitive sensing device and detecting method for the conductive matter therein, the touch object may be determined whether it is an irregular conductive matter, thereby ruling out false motion due to the irregular conductive matter. Additionally, according to some embodiments of the capacitive sensing device and detecting method for the conductive matter therein, the detecting steps are upgraded to increase detecting speed and computing efficiency.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A detecting method for a conductive matter on a capacitive sensing device, comprising:
   obtaining a positive signal;
   computing a signal summation of a plurality of sensing points on at least one electrode line selected from a plurality of transmitting electrode lines and receiving electrode lines where the positive signal occurred;
   comparing the signal summation to a predetermined value;

determining a touch object inducing the positive signal is not an irregular conductive matter if the signal summation is greater than the predetermined value;
determining the touch object inducing the positive signal is the irregular conductive matter if the signal summation is not greater than the predetermined value;
verifying whether an occurred location of the positive signal belongs to unknown location information prior to the step of computing the signal summation;
performing the step of computing the signal summation if it is verified that the occurred location of the positive signal belongs to the unknown location information; and
performing a point-tracking process according to the positive signal rather than performing the step of computing the signal summation if it is verified that the occurred location of the positive signal belongs to known location information.

2. The detecting method of claim 1, wherein if it is verified that the occurred location of the positive signal belongs to the unknown location information, further comprises:
establishing an inspection window according to the occurred location of the positive signal;
detecting whether at least one negative signal exists in the inspection window;
performing the step of computing the signal summation if there is the at least one negative signal in the inspection window; and
determining the touch object inducing the positive signal is not the irregular conductive matter if there is not any negative signal in the inspection window.

3. The detecting method of claim 1, further comprising:
identifying all of at least one touched point and computing a current total number of the at least one touched point, wherein each of the at least one touched point includes a plurality of adjacent sensing points;
comparing the current total number with a previous total number of touched point;
performing a point-tracking process for each of the at least one touched point if the current total number is not greater than the previous total number; and
performing the step of obtaining the positive signal of each of the at least one sensing point for each of the at least one touched point if the current total number is greater than the previous total number.

4. The detecting method of claim 3, further comprising:
verifying whether an occurred location of the positive signal belongs to unknown location information prior to the step of computing the signal summation;
performing the step of computing the signal summation if it is verified that the occurred location of the positive signal belongs to the unknown location information; and
performing a point-tracking process according to the positive signal rather than performing the step of computing the signal summation if it is verified that the occurred location of the positive signal belongs to known location information.

5. The detecting method of claim 4, wherein if it is verified that the occurred location of the positive signal belongs to the unknown location information or the current total number is greater than the previous total number, further comprises:
establishing an inspection window according to the occurred location of the positive signal;
detecting whether at least one negative signal exists in the inspection window;
performing the step of computing the signal summation if there is the at least one negative signal in the inspection window; and
determining the touch object inducing the positive signal is not the irregular conductive matter if there is not any negative signal in the inspection window.

6. The detecting method of claim 1, further comprising:
retaining the location information of the positive signal if it is determined that the touch object inducing the positive signal is not the irregular conductive matter; and
ignoring the location information of the positive signal if it is determined that the touch object inducing the positive signal is the irregular conductive matter.

7. The detecting method of claim 1, wherein if it is determined that the touch object inducing the positive signal is the irregular conductive matter, further comprises updating a threshold value corresponding to the sensing point of the positive signal according to the positive signal.

8. The detecting method of claim 1, wherein the predetermined value is zero to two times of a fingering signal.

9. A capacitive sensing device, comprising:
a plurality of first electrode lines;
a plurality of second electrode lines crossing the first electrode lines, the first electrode lines and the second electrode lines defining a plurality of sensing points in matrix; and
a sensing controller electrically connected to the first electrode lines and the second electrode lines, the sensing controller executing:
obtaining a positive signal;
computing a signal summation of the sensing points on at least one electrode line selected from the first and second electrode lines where the positive signal is occurred;
comparing the signal summation to a predetermined value;
determining a touch object inducing the positive signal being not an irregular conductive matter if the signal summation is greater than the predetermined value; and
determining the touch object inducing the positive signal is the irregular conductive matter if the signal summation is not greater than zero;
wherein prior to the step of computing the signal summation, the sensing controller further executing:
verifying whether an occurred location of the positive signal belongs to unknown location information;
performing the step of computing the signal summation if it is verified that the occurred location of the positive signal belongs to the unknown location information; and
performing a point-tracking process according to the positive signal rather than performing the step of computing the signal summation if it is verified that the occurred location of the positive signal belongs to known location information.

10. The capacitive sensing device of claim 9, wherein if it is verified that the occurred location of the positive signal belongs to the unknown location information, and prior to performing the step of computing the signal summation, the sensing controller further executing:
establishing an inspection window according to the occurred location of the positive signal;

detecting whether at least one negative signal exists in the inspection window;

performing the step of computing the signal summation if there is the at least one negative signal in the inspection window; and determining the touch object inducing the positive signal is not the irregular conductive matter if there is not any negative signal in the inspection window.

11. The capacitive sensing device of claim 9, wherein the sensing controller further executing:

retaining the location information of the positive signal if it is determined that the touch object inducing the positive signal is not the irregular conductive matter; and ignoring the location information of the positive signal if it is determined that the touch object inducing the positive signal is the irregular conductive matter.

12. The capacitive sensing device of claim 9, wherein if it is determined that the touch object inducing the positive signal is the irregular conductive matter, the sensing controller further executes updating a threshold value corresponding to the sensing point of the positive signal according to the positive signal.

13. The capacitive sensing device of claim 9, wherein the predetermined value is zero to two times of a fingering signal.

14. A capacitive sensing, comprising:

a plurality of first electrode lines;

a plurality of second electrode lines crossing the first electrode lines, the first electrode lines and the second electrode lines defining a plurality of sensing points in matrix; and a sensing controller electrically connected to the first electrode lines and the second electrode lines, the sensing controller executing:

obtaining a positive signal;

computing a signal summation of the sensing points on at least one electrode line selected from the first and second electrode lines where the positive signal is occurred;

comparing the signal to a predetermined value;

determining a touch object inducing the positive signal being not an irregular conductive matter if the signal summation is greater than the predetermined value; and determining the touch object inducing the positive signal is the irregular conductive matter if the signal summation is not greater than zero;

wherein the sensing controller further executing:

identifying all of at least one touched point each which includes a plurality of adjacent sensing points;

computing a current total number of the at least one touched point;

comparing the current total number with a previous total number of touched point;

performing a point-tracking process for each of the at least one touched point if the current total number is not greater than the previous total number; and performing the step of obtaining the positive signal of each of the at least one sensing point for each of the at least one touched point if the current total number is greater than the previous total number.

15. The capacitive sensing device of claim 14, wherein prior to the step of computing the signal summation, the sensing controller further executing:

verifying whether an occurred location of the positive signal belongs to unknown location information;

performing the step of computing the signal summation if it is verified that the occurred location of the positive signal belongs to the unknown location information; and performing a point-tracking process according to the positive signal rather than performing the step of computing the signal summation if it is verified that the occurred location of the positive signal belongs to known location information.

16. The capacitive sensing device of claim 15, wherein if it is verified that the occurred location of the positive signal belongs to the unknown location information or the current total number is greater than the previous total number, and prior to performing the step of computing the signal summation, the sensing controller further executing:

establishing an inspection window according to the occurred location of the positive signal;

detecting whether at least one negative signal exists in the inspection window;

performing the step of computing the signal summation if there is the at least one negative signal in the inspection window; and determining the touch object inducing the positive signal is not the irregular conductive matter if there is not any negative signal in the inspection window.

* * * * *